Nov. 4, 1969  F. W. R. STARP  3,476,031
SELF-WINDING PHOTOGRAPHIC SHUTTER WITH AN ELECTRONIC TIMING DEVICE
Filed July 11, 1967  5 Sheets-Sheet 1
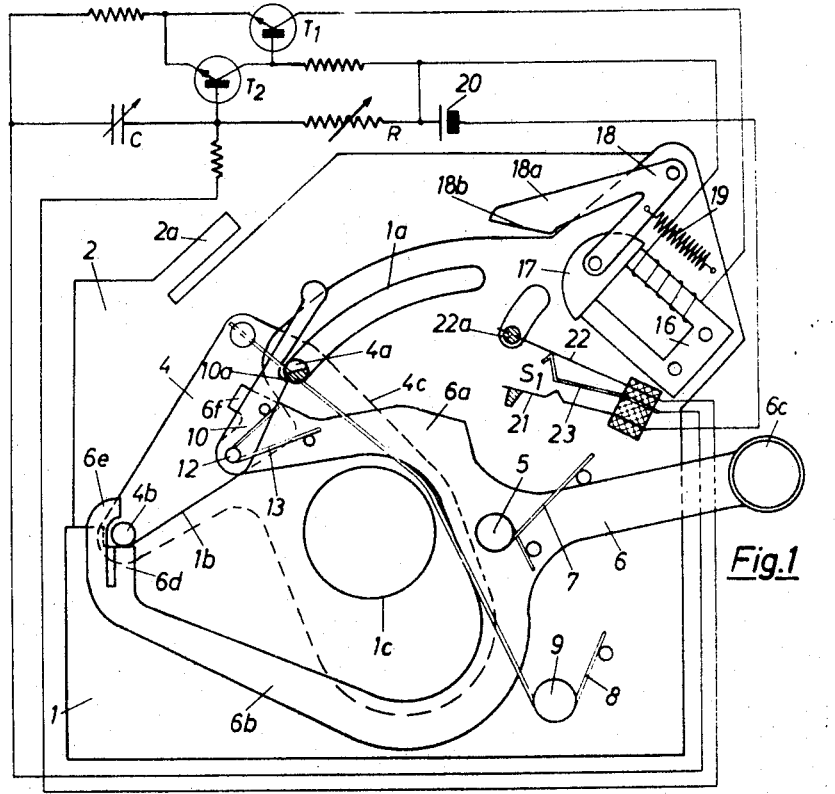
Fig.1
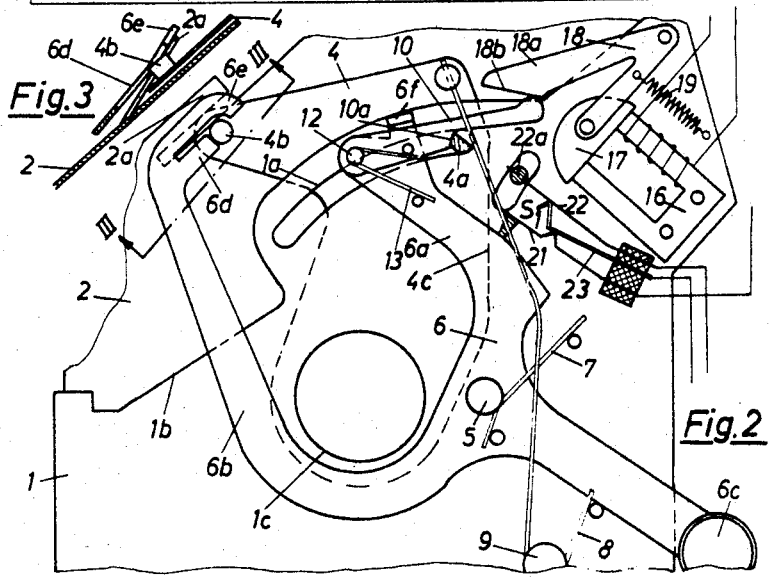
Fig.3
Fig.2
INVENTOR.
Franz W.R.Starp
BY ARTHUR A. MARCH
ATTORNEY

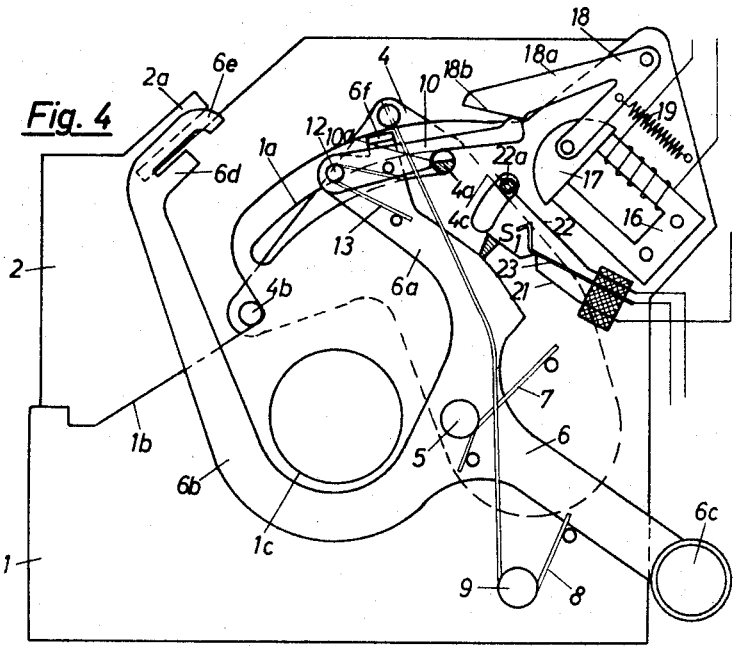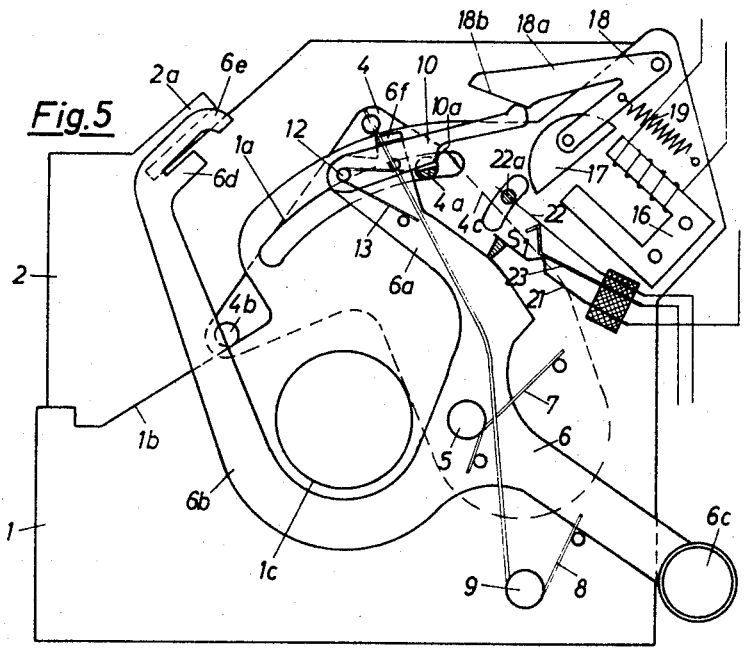

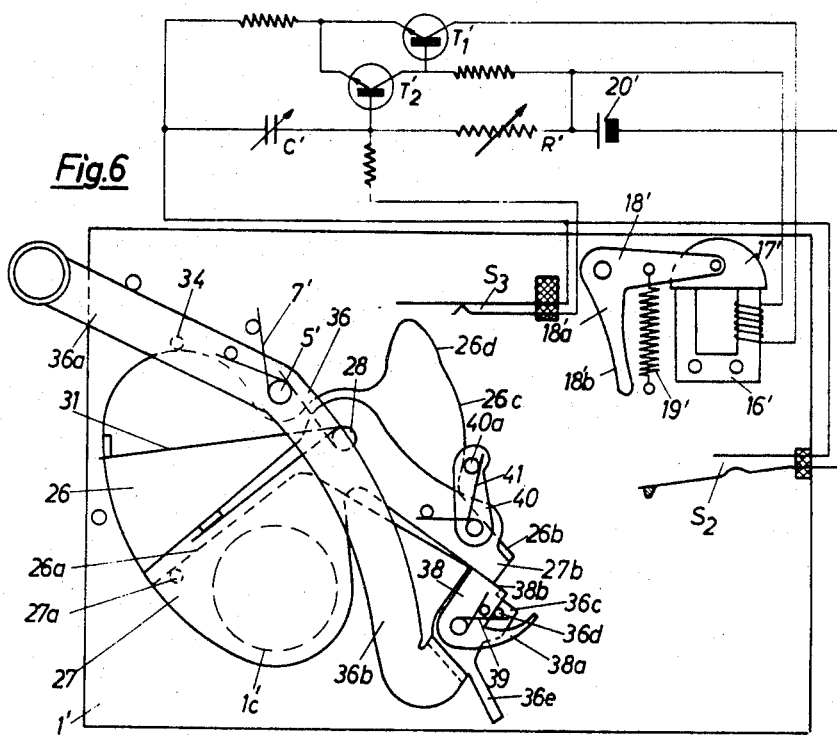
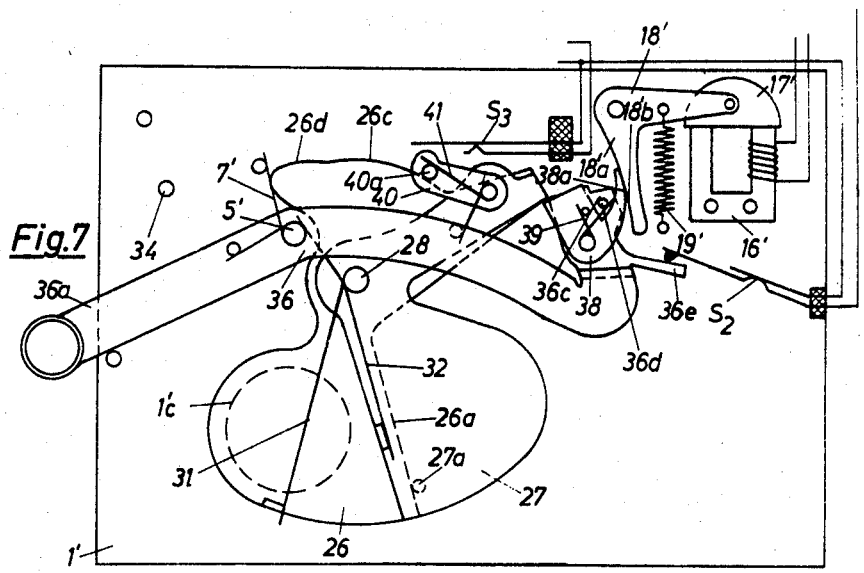

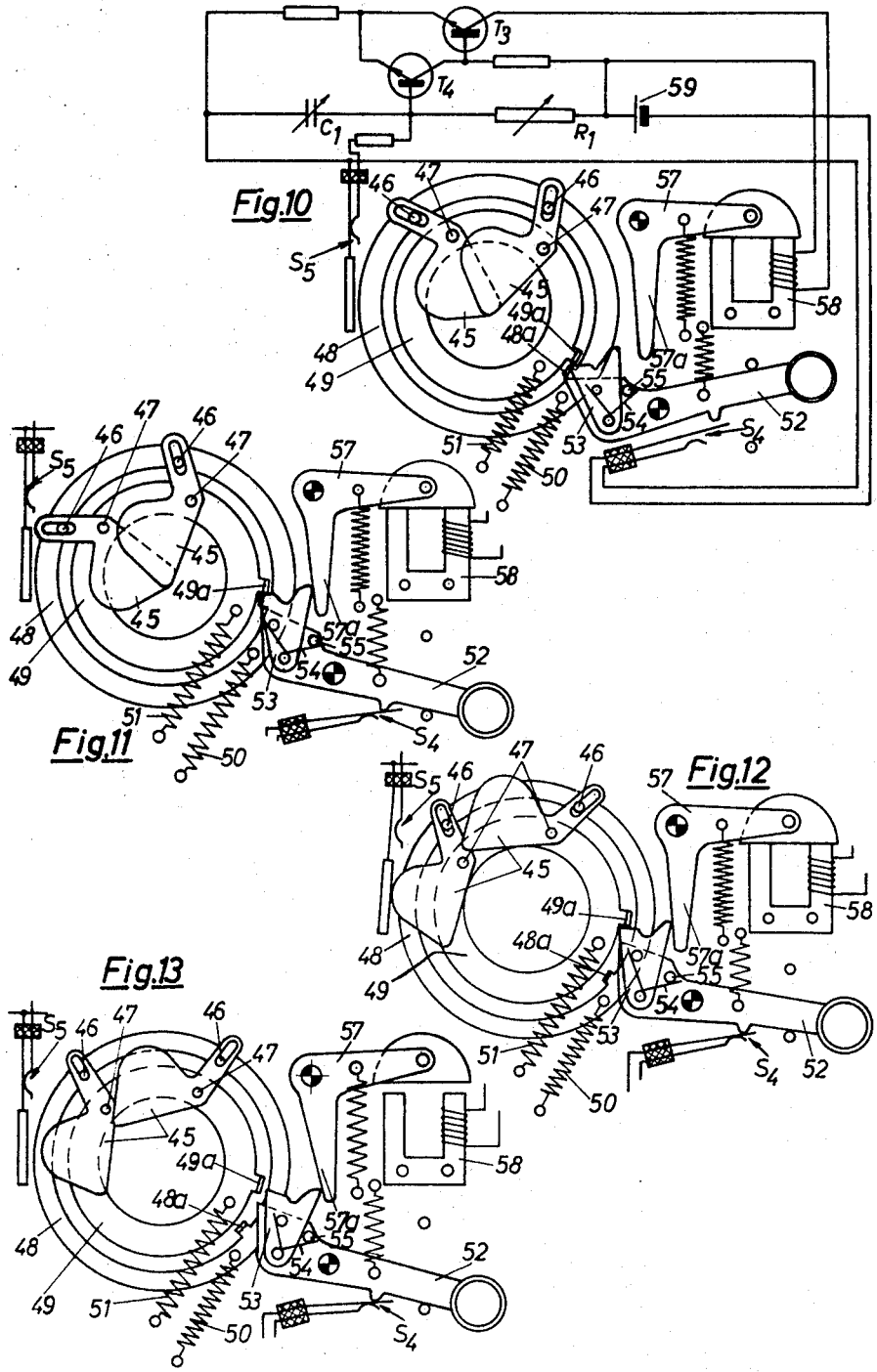

United States Patent Office 3,476,031
Patented Nov. 4, 1969

3,476,031
SELF-WINDING PHOTOGRAPHIC SHUTTER WITH AN ELECTRONIC TIMING DEVICE
Franz W. R. Starp, Calmbach, Black Forest, Germany, assignor to Prontor-Werk Alfred Gauthier G.m.b.H., Calmbach, Black Forest, Germany, a corporation of Germany
Filed July 11, 1967, Ser. No. 652,593
Claims priority, application Germany, July 11, 1966, P 39,929
Int. Cl. G03b 9/14, 9/00
U.S. Cl. 95—63                    8 Claims

ABSTRACT OF THE DISCLOSURE

A self-winding photographic camera having an electronically controlled timing device and a shutter blade system operable by a winding and release lever. The shutter blade system is blockable in the open position by blocking lever in order to achieve exposure times longer than the shortest possible times provided by the shutter. The blocking lever cooperates with an armature and an electromagnet of the timing device to arrest the blocking lever for the duration of the time function. The armature is mounted on an armature lever biased by a tension spring causing the armature to make contact with the electromagnet. The blocking lever is a pawl mounted on the winding and release lever and engageable with the shutter blade system for preventing the shutter blade system from closing for the duration of the run-off function of the timing device. The pawl is biased by a spring and positioned to engage the armature lever in the final phase of the winding motion for exerting a turning moment greater than and directionally opposed to that of the tension spring biasing the armature lever.

---

This invention relates to a self-winding photographic shutter with an electronically controlled timing device having a shutter blade system operable by means of a winding and release lever. The shutter blade system is blockable in the open position to achieve exposure times longer than the shortest possible by means of a lever carrying an armature or cooperating with an armature lever held by an electromagnet for the duration of the time formation.

Electronically controlled self-winding shutters in which a locking lever blocking the shutter blades in open position is brought into and out of the locking position by means of an armature lever influenceable by an electromagnet are already known. In such known shutter arrangements, the armature lever is automatically caused to contact the electromagnet by the winding and release lever in usual manner and is held by the electromagnet until the activation of the timing device has taken place. Thus, the holding power of the electromagnet is utilized in most cases, because it is considerably greater than its attractive power. This is the case even when the armature is to be attracted only across a relatively small dimensioned air gap. The electromagnet as such can consequently be dimensioned small, which is not only desirable for the most varied reasons, but is a basic prerequisite in designing electronically controlled shutters. However, the known shutter arrangements are still in need of improvement in that the armature of the electromagnet must be brought up to the electromagnet during the winding and release process against the force of a return spring. To assure that the armature rests against the magnet core in a secure and flush manner, the motional relationships had to be so chosen up to now so that the armature lever performed an overtravel movement. This, in turn, results in an unavoidable increase of the release moment of the shutter of the camera.

It is an object of this invention to perfect a self-winding shutter with an electronic timing device that achieves a noticeable reduction of the pressure moment required to release the camera without a noteworthy additional expenditure of structural components while simultaneously guaranteeing perfect functioning.

It has now been found that the foregoing object and other advantages can be readily attained in a self-winding photographic shutter with an electronically controlled timing device having a tension spring engaging the armature lever to cause the armature to contact the magnet. In addition a pawl is provider that prevents the shutter blade system in open position from performing its closing motion for the duration of the functional run-off of the timing device. The pawl is likewise under the influence of a spring and is disposed on the winding and release lever in a position to strike against the armature lever in the final phase of the winding motion. The pawl exerts a turning moment on the armature lever that is directionally opposed and greater than the moment tension spring on the armature lever. In this manner it is possible to create with relatively few and simple means the conditions under which the practical requirements for operating an electronically controlled self-winding shutter are met, where, on the one hand, no overtravel is needed during the winding and release process and, on the other hand, an additional increase of the winding moment is avoided.

For the further improvement of the self-winding shutter of this invention for the purpose of achieving a simple design as well as a functionally reliable operating mode, it is further proposed according to this invention to equip the armature lever with an additional lever arm and to provide the latter with a striking edge located in the range of motion of the pawl. The pawl is articulately arranged on the winding and release lever and is provided with a locking edge holding the shutter blade system in open position for the duration of the time formation.

This invention can be applied to particular advantage to a self-winding shutter with one shutter blade leading and one shutter blade trailing during the exposure process or with two drive rings serving to mount several shutter blades following each other at a time interval. The pawl preventing the closing motion of the shutter blade system may be articulated on the winding and release lever in such a manner that, during the winding process, it attacks a component of the shutter blade system which component effects the conclusion of the exposure process. This measure also increases the functional reliability of the shutter as it achieves an automatic sequence of function of the various phases during the winding and release motion and during the exposure process.

Other objects and advantages will be readily apparent from the following detailed specification and attached drawings showing three embodiments as examples wherein:

FIGURE 1 is a top view of a self-winding shutter embodying this invention having single shutter blades illustrated in the normal position;

FIGURE 2 is a partial view of the shutter arrangement of FIGURE 1 illustrated in the end phase of the winding motion;

FIGURE 3 is a partial cross-sectional view taken along lines III—III in FIGURE 2;

FIGURE 4 is a partial view similar to FIGURE 1 illustrating the shutter in open position with the shutter blade held by the swung-in pawl;

FIGURE 5 is a partial view similar to FIGURE 1 illustrating again the same shutter arrangement in the starting phase of the closing motion;

FIGURE 6 is a top view of another embodiment of the invention illustrating a shutter arrangement with one leading and one trailing shutter blade in normal position;

FIGURE 7 is a partial view similar to FIGURE 6 illustrating the shutter arrangement at the end of the winding motion, immediately prior to the release of the leading shutter blade;

FIGURE 10 is a top view of another embodiment of the shutter arrangement of this invention with 5 shutter blades, for example, which are supported by two following sector rings and illustrated in the rest position;

FIGURE 11 is a partial view of the shutter arrangement of FIGURE 10 illustrated in the end phase after the cocking and release movement;

FIGURE 12 is a view similar to FIGURE 11 illustrating the shutter in open position with the following ring being held by the retracted pawl; and FIGURE 13 is a view similar to FIGURE 11 illustrating the shutter in the initial phase of the closing movement.

Figure 8:
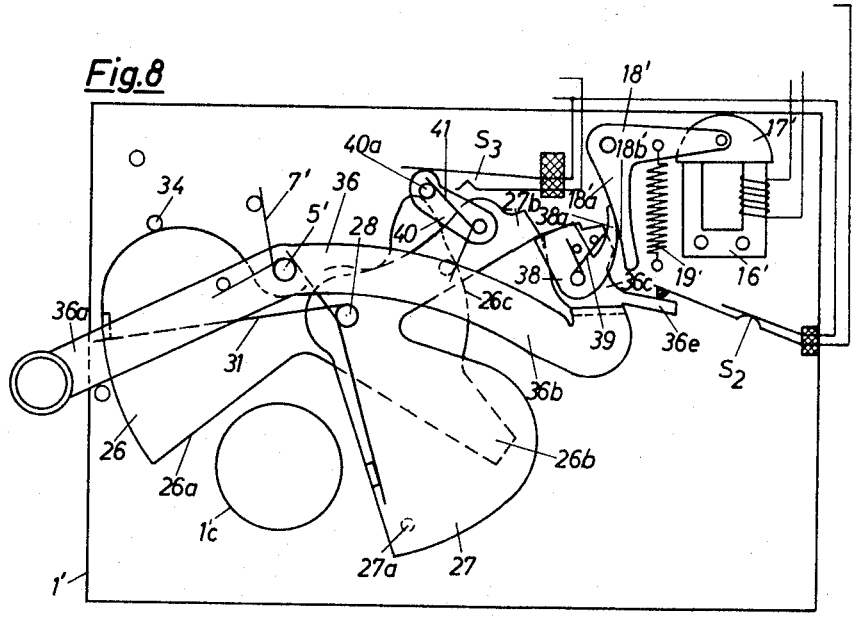
FIGURE 8 is a partial view similar to FIGURE 6 illustrating the shutter in the open position, whereby the closing blade is arrested by the swung-out pawl.

Referring now to the drawings, one embodiment of this invention is illustrated in FIGURES 1 to 5 in the form of a self-winding shutter having a base plate 1 and a cover plate 2, which if required, can be so designed as to form the front side wall of a camera housing. Between the base plate 1 and the cover plate 2 there is arranged a shutter blade system which, according to the arrangement shown in FIGS. 1 to 5, consists of a single generally L-shaped shutter blade 4. For mounting and guiding the shutter blade 4 there is provided in the base plate 1 a slot 1a in the shape of a circular arc, and in addition there is provided a guiding and supporting edge 1b extending in a straight line and approximately in the same direction as the slot 1a. The shutter blade 4 has a pin 4a and a drive pin 4b, the pin 4a being guided in the slot 1a while the drive pin 4b rests against the edge 1b.

To actuate the shutter blade 4 there is mounted on a pin 5 a winding and release lever 6 having the fork shape shown in the drawings and loaded by a return spring 7. The arms 6a and 6b of the winding and release lever 6, extend past both sides of the aperture 1c of the objective and cooperate with the pin 4a and the drive pin 4b of shutter blade 4. A third arm 6c serves to receive the actuating pressure for winding and releasing the shutter. The shutter blade 4 is loaded directly by a drive spring 8 mounted on a pin 9 of the base plate 1.

As may be seen from the drawings, the arm 6a of winding and release lever 6 carries a pivoting pawl 10 which cooperates with the pin 4a in a manner described below in greater detail. At the other arm 6b of winding and release lever 6 there is provided a tab 6d whose face rests against the drive pin 4b, pushing this pin ahead of it when the winding and release lever 6 is brought into the wound position. To prevent a bypass motion of the pin 4b during the winding process, another tab 6e, partially encompassing the pin 4b cooperates with the tab 6d. Located in the range of motion of the tab 6e there is provided on the cover plate 2 a tab 2a which is designed as an oblique striking edge, as illustrated in FIG. 3, and is so arranged that the arm 6b is automatically lifted out of its original plane of motion at the end of the winding motion, so that the pin 4b and the shutter blade 4 are freed for the opening motion.

The pawl 10, mounted on a pin 12 on the winding and release lever 6, makes contact with a tab 6f on the arm 6a under the influence of a spring 13. The pawl 10 is preferably designed as a single arm lever and has an edge 10a. The pin 4a has a semi-circular portion protruding out of the slot 1a of base plate 1 that rests against the edge 10a when the pin 4b, as described above, is freed. The consequence being that the shutter blade 4, due to the influence of the drive spring 8, performs a counter-clockwise rotary motion around the pin 4a.

To make it possible to take pictures of varying exposure time with the above described shutter arrangement, a timing device, which expediently works on electronic basis is provided, which comprises an electromagnet 16 disposed on the base plate 1. Correlated with the electromagnet 16 is an armature 17 linked to a pivotally mounted armature lever 18 of dual arm design. The armature lever 18 is loaded by a spring 19 acting as extension spring in such a manner that the armature lever 17 in the normal position of the shutter shown in FIG. 1 automatically rests against the electromagnet 16. Provided on an arm 18a of armature lever 18 is a striking edge 18b which is located in the range of motion of the pawl 10 and which swings the pawl 10 into a position to arrest the shutter blade 4 in its open position toward the end of the winding and release motion.

The electronic timing device comprises a trip circuit which has as essential components two emitter-coupled transistors $T_1$ and $T_2$, a capacitor C, variable if desired and, for example, a similarly adjustable time regulating resistor R. A switch S, serves as the electrical connection between the trip circuit and a battery 20 and has, besides a contact spring 21 directly connected to the battery 20, another contact spring 22 that when resting against a contact 23, allows the capacitor C to be short-circuited in the normal position of the shutter. While the arm 6a actuates the contact spring 21, the contact spring 22 is lifted off the contact 23 when the shutter blade 4 changes over into the open position due to its edge 4c which thereby strikes against a pin 22a.

The handling and operation of the shutter arrangement described above and illustrated in FIGS. 1 to 5 are as follows:

When the winding and release lever 6 is turned clockwise around the pin 5 preparatory to taking a picture, the shutter blade 4 is moved from its starting position shown in FIG. 1 into the intermediate position shown in FIG. 2, whereby the tension of drive spring 8 increases due to the pawl 10 engaging the pin 4a. During this motion, the arm 6a of the winding and release lever 6 has first caused the contact spring 21 to rest against the contact 23 so that current can flow in electromagnet 16 through the emitter-collector sector of the transistor $T_1$. The armature lever 18, already resting against the electromagnet 16, is now held in this position by the addition of magnetic force.

During the winding motion, the hook-shaped tab 6e of the winding and release lever 6 strikes against the oblique tab 2a of the cover plate 2 and leads the tab 6d upwardly along the surface of the drive pin 4b toward its free end as illustrated in FIG. 3. At the same time, the rounded free end of the pawl 10 strikes against the edge 18b of armature lever 18 arrested by magnetic force and is thereby turned clockwise relative to the winding and release lever 6 so that the rounded edge 10a of the pawl encompasses the semi-circular portion of the pin 4a in accordance with the view shown in FIG. 2. As soon as the shutter blade 4 has reached the wound position, the tab 6d of the winding and release lever 6 automatically disengages from the drive pin 4b so that the shutter blade 4 turns counterclockwise, as viewed in the drawings, around the pin 4a, acting as instantaneous pivot point, under the influence of the drive spring 8, until the pin 4b hits the edge 1b of the base plate 1, thereby freeing the aperture 1c of the shutter.

During this rotary motion of th shutter blade 4, the engagement depth of the edge 10a of pawl 10 at the semi-circular portion of pin 4a has become smaller, however, the overlap of the edge 10a with the protruding portion of the pin 4a is still sufficient so that the pin 4a is arrested in the open position according to FIG. 4 thereby preventing the shutter blade 4 from closing for the time being. Finally, as the shutter blade 4 changes over into the open position, its edge 4c lifts the contact spring 22 off the contact 23 of switch $S_1$ so that the capacitor C starts charging. When the capacitor C, after a period of time depending essentially on the resistance value of the resistor R, has reached the base potential of the transistor $T_2$, the transistor $T_2$ becomes active while the transistor $T_1$ is blocked. Accordingly the electromagnet 16 becoming currentless causing the magnetic field to collapse, thereby freeing the armature 17. Since the spring 13 assigned to the pawl 10 is designed to be stronger than the tension spring 19, the pawl 10 turns under the influence of the spring 13 until it rests against the tab 6f of the winding and release lever 6, whereby the armature lever 18 is taken along in a clockwise direction.

With the return of the pawl 10, the pin 4a loses its support at the edge 10a so that the shutter blade 4, under the influence of the loaded drive spring 8, is moved to the left as viewed in FIG. 5, whereby the pin 4b slides along the supporting edge 1b, and the pin 4a travels to the other end of the slot 1a. After removal of the load from the winding and release lever 6 it returns to its initial position under the influence of its return spring 7, whereby the pawl 10 leaves the striking edge 18b of the armature lever 18 so that the tension spring 19 can cause the armature to contact electromagnet 16 again.

As illustrated in FIGS. 6 to 9, the shutter blade system may also consist of two shutter blades, one leading blade 26 and one trailing blade 27. In this embodiment, the components which are identical with components of the above described arrangement have the same reference symbols, with the addition of a prime mark. The two shutter blades 26 and 27 are mounted, for instance, on a common pin 28 of shutter base plate 1' and each are loaded in the same direction by drive springs 31 and 32, respectively. While the leading shutter blade 26 in its normal position shown in FIG. 6 rests against a pin 34 of base plate 1', a pin 27a of the trailing shutter blade 27 abuts against an edge 26a of the first mentioned shutter blade.

To actuate the shutter blade system 26, 27, there is disposed on a pin 5' a winding and release lever 36 of dual arm design which is loaded clockwise by a return spring 7'. An arm 36a of winding and release lever 36 again serves to receive the actuating pressure for winding and releasing the shutter, whereas an arm 36b is provided with a hook-shaped end 36c on which a pawl 38 is disposed, preferably so as to be articulating. A spring 39 holds the pawl 38, equipped with an arm 38a, in contact-making position with a pin 36d of the winding and release lever 36 when the shutter is in normal position. Each shutter blade 26 and 27, respectively, can be provided with a lever-shaped extension 26b and 27b, respectively. Thereby, it is expedient for the arrangement to be such that the arm 26b rests against the face of the hook-shaped end 36c of the winding and release lever 36 and that the arm 27b likewise rests against the face of the pawl 38.

In the same manner as in the first described embodiment, the pawl 38 cooperates with a dual armature lever 18' having an armature 17' resting against an electromagnet 16' under the influence of a tension spring 19'. Provided on an arm 18a' of the armature lever 18' is a striking edge 18b' which is located in the range of motion of the arm 38a of the pawl 38.

The electron circuit serving to control the electromagnet 16' is, in principle, of the same make-up as in the arrangement shown in FIGS. 1 to 5. Additionally however, to get the electronic timing device to operate, another contact switch $S_2$ is provided which can be actuated by a tab 36e of the winding and release lever 36. Finally, in the electronic circuit there is also arranged another contact switch $S_3$ which short-circuits the capacitor $C'$ in the normal position of the shutter and which is opened by the shutter blade system 26, 27. For this purpose, a switching lever 40, biased by a spring 41 by means of a pin 40a against a concentric cam 26c disposed on the shutter blade 26, is linked to the arm 27b of the trailing shutter blade 27. Adjacent to the concentric cam 26c is a lifting cam 26d which, when the shutter blade 26 changes over into the open position, causes switching lever 40 to perform a rotary motion relative to the arm 27b which, in turn, results in the opening of switch $S_3$.

To take a picture, the winding and release lever 36 is turned counterclockwise so that its hook-shaped end 36c moves the shutter blade 26 and the pawl 38 moves the shutter blade 27, thereby increasing the tension of the drive springs 31 and 32. During this rotary motion, the tab 36e first closes the contact switch $S_2$ so that current flows in the electromagnet 16' through the emitter-collector sector of transistor $T_1'$ while the transistor $T_2'$ is blocked. Thus the armature lever 18' is held by the force of the electromagnet 16'. In the further course of the winding and release motion, the arm 38a of the pawl 38 engages against the striking edge 18b' of armature lever 18' which, as may be seen from FIG. 7, causes a counterclockwise rotation of the pawl 38 relative to the winding and release lever 36. Since the shutter blades 26 and 27 and the winding and release lever 36 turn around mounting pins 28 and 5', respectively, which are located apart from each other, the hook-shaped end 36c of the winding and release lever 36 finally leaves the arm 26b of the leading shutter blade 26. Accordingly, the shutter blade 26 now changes over, under the influence of the drive spring 31, into the open position according to FIG. 8 in which the exposure aperture 1c' is freed. The trailing shutter blade 27, in contrast, is still held in the wound position due to its arm 27b supporting itself against the locking edge 38b of the pawl 38.

Figure 9:
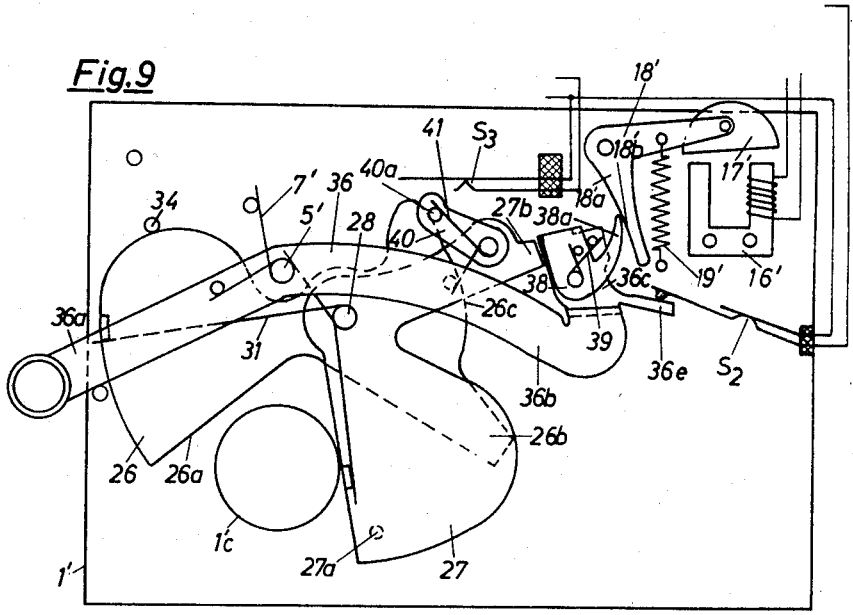
FIGURE 9 is a partial view similar to FIGURE 6 illustrating the shutter in the starting phase of the closing motion.

During the opening motion of the shutter blade 26, the lifting cam 26d pushes itself under the pin 40a of the switching lever 40 and turns the lever 40 clockwise relative to the arm 27b of shutter blade 27, thereby opening the switch $S_3$ and terminating the short-circuit of the capacitor $C'$. The electronic circuit now runs off similar to the manner described above concluding in the electromagnet 16' becoming currentless. As a consequence, the spring 39 which exerts on the armature lever 18' a greater turning moment than the tension spring 19', causes the pawl 38 to rest against the pin 36d again. As illustrated in FIGURE 9 the arm 27b thereby loses its support at the locking edge 38b of the pawl 38 so that the shutter blade 27 can run off clockwise under the influence of the spring 32 thereby closing the exposure aperture 1c'. After the actuating force is removed from the winding and release lever 36, the spring 7' brings the lever 36 into its initial position, whereby the spring loaded arm 36b slides over the two arms 26b and 27b of the shutter blade 27 and 26 so that the arm 36b and the pawl 38 are finally engaged again in front of these arms.

Another embodiment of this invention is illustrated in FIGURES 10 to 13 which is similar in its function to the above described arrangements. This shutter blade system consists of more than two, for example, 5 shutter blades 45, which are supported by means of pins 46 and 47 on two sector rings 48 and 49 arranged concentrically to the optical axis of the shutter for rotation so that they follow each other at a time interval. Each of these two rings are biased by a drive spring 50 and 51 in the same direction of rotation. Associated with the two rings 48 and 49 is a cocking and release lever 52 which carries at one end a hinged pawl 53, which in turn bears on a spring 54 which also bears on a pin 55 of the cocking and release lever 52. In the rest position illustrated in FIGURE 10, the opening ring 48 bears with a lug 48a on an edge of the cocking and release lever 52 and the following closing ring 49 bears with a lug 49a on an edge of the pawl 53.

When the cocking and release lever 52 is pressed down, the two rings 48 and 49 are brought into the cocking position shown in FIG. 11 against the action of the spring 50 and 51 with the shutter remaining closed. However, the pawl 53 strikes on an arm 57a of a spring biased armature lever 57 bearing on an electromagnet 58 of the electronic timing device, and performs a counterclockwise rotation relative to the cocking and release lever 52. During the movement of the cocking and release lever 52 a switch $S_4$ is closed and thus the electronic timing device is connected with the battery 59 so that a transistor $T_3$ is controlling while the transistor $T_4$ remains currentless. Due to the action of the transistor $T_3$, the electromagnet 58 receives current so that the armature lever 57 is also held by magnetic force.

At the end of the cocking and release movement the lever 52 leaves the lug 48a of opening ring 48, which then runs off counterclockwise due to the reaction of its spring and brings the sectors 45 into the open position shown in FIGURE 12 while the ring 49 is still held due to the support of retracted pawl 53 on arm 57a of the armature lever 57. When changing to the open position a switch $S_5$ is opened by means of one of the sectors 45 so that the short circuit of a condensor $C_1$ of the electronic timing device is thus eliminated. After a certain time has elapsed which is determined by the ohmic value of the time determining resistor $R_1$, the electronic circuit reverses and the transistor $T_4$ becomes conductive and the transistor $T_3$ and electromagnet 58 becomes currentless. By eliminating the magnetic holding force the pawl 53 can turn the armature lever 57 under the influence of a spring 54 and release at the same time the closing ring 49 as illustrated in FIGURE 13 so that the closing ring 49 can move and return the shutter blade 45 into the closed position.

It will be understood that the foregoing description with the details of exemplary structure is not to be construed in any way to limit the invention, but that modifications may be made thereto without departing from the scope of the invention as set forth in the following claims.

Having thus described my invention, I claim:

1. A self-winding photographic shutter comprising an electronically controlled timing device, a shutter blade system actuatable by a winding and release lever, said shutter blade system being blockable in the open position by a blocking lever for achieving exposure times longer than the shortest possible with said shutter, said blocking lever cooperating with an armature and an electromagnet of said timing device to arrest said blocking lever for the duration of the time function, said armature being mounted on an armature lever biased by a tension spring causing said armature to make contact with said electromagnet, said blocking lever being a pawl mounted on said winding and release lever and engageable with said shutter blade system for preventing said shutter blade system from performing its closing motion for the duration of the run-off of the function of said timing device, said pawl being biased by a spring and positioned to engage said armature lever in the final phase of the winding motion, said pawl exerting on said armature lever a turning moment greater than and directionally opposed to that of said tension spring biasing said armature lever.

2. The self-winding photographic shutter of claim 1 wherein said armature lever has an additional lever arm with a striking edge located in the range of motion of said pawl, said pawl being articulately disposed on said winding and release lever and having a locking edge engageable with said shutter blade system in open position for arresting said shutter blade system for the duration of the time function.

3. The self-winding photographic shutter of claim 2 wherein said shutter blade system has one shutter blade leading and one shutter blade trailing during the exposure process, and wherein said pawl preventing said shutter blade system from performing its closing motion is articulated by said pawl spring on said winding and release lever upon the release of said armature lever by said timing device and disengaged from a component of said shutter blade system to effect the conclusion of the exposure process.

4. The self-winding photographic shutter of claim 2 wherein said shutter blade system has two drive rings adapted to trail each other at a time interval, said two drive rings mounting a plurality of shutter blades, and wherein said pawl engages a component of said drive rings to prevent said shutter blade system from performing its closing motion, said pawl being articulated by said pawl spring on said winding and release lever upon the release of said armature lever by said timing device and disengaged from said component of said drive rings to effect the conclusion of the exposure process.

5. A self-winding photographic camera comprising electronically controlled timing means having an armature and electromagnet, shutter blade means operable by a winding and release lever and controlled by said timing means to achieve extended exposure times, an armature lever movably mounting said armature, biasing means engaged with said armature lever causing said armature to be biased into engagement with said electromagnet, a pawl pivotally mounted on said winding and release lever and engageable with said shutter blade means for preventing said shutter blade means from closing for the duration of the run-off of said timing means, said pawl having biasing means and positioned to be engaged by said armature lever in the final phase of the winding motion to arrest said pawl for the duration of time function, said pawl biasing means causing said pawl to exert on said armature lever a force greater than and directionally opposed to that of said biasing means biasing said armature lever.

6. The self-winding photographic shutter of claim 5 wherein said armature lever has a second lever arm with a striking edge located in the range of motion of said pawl and engageable therewith, said pawl being articulately disposed on said winding and release lever and having a locking edge engageable with said shutter blade means in open position for arresting said shutter blade means for the duration of the time function.

7. The self-winding photographic shutter of claim 6 wherein said shutter blade means has one shutter blade leading and one shutter blade trailing during the exposure process, and wherein said pawl preventing said shutter blade means from performing its closing motion is articulated by said pawl spring on said winding and release lever upon the release of said armature lever by said timing device and disengaged from one of said shutter blades to effect the conclusion of the exposure process.

8. The self-winding photographic shutter of claim 6 wherein said shutter blade means has two drive rings adapted to trail each other at a time interval, said two drive rings mounting a plurality of shutter blades, and wherein said pawl engages a component of said drive rings to prevent said shutter blade means from performing its closing motion, said pawl being articulated by said pawl biasing means on said winding and release lever upon the release of said armature lever by said timing device and disengaged from said component of said drive rings to effect the conclusion of the exposure process.

References Cited

UNITED STATES PATENTS

| 3,386,363 | 6/1968 | Rentschler | 95—53 |
| 3,392,650 | 7/1968 | Richter | 95—63 |
| 3,398,668 | 8/1968 | Starp | 95—53 |

NORTON ANSHER, Primary Examiner

L. H. McCORMICK, Jr., Assistant Examiner

U.S. Cl. X.R.

95—53